United States Patent
Trushell et al.

[11] Patent Number: 5,612,590
[45] Date of Patent: Mar. 18, 1997

[54] ELECTRIC LAMP HAVING FLUORESCENT LAMP COLORS CONTAINING A WIDE BANDWIDTH EMISSION RED PHOSPHOR

[75] Inventors: Charles Trushell; Liviu Magean, both of Morgantown, W. Va.

[73] Assignee: Philips Electronics North America Corporation, New York, N.Y.

[21] Appl. No.: 572,219

[22] Filed: Dec. 13, 1995

[51] Int. Cl.⁶ .............................. H01J 1/62; H01J 63/04; C09K 11/08
[52] U.S. Cl. .................. 313/487; 313/486; 252/301.4 R
[58] Field of Search ................... 313/485–489, 313/490–493, 635, 636; 252/301.4 R, 301.4 H, 301.6 R, 301.6 F

[56] References Cited

U.S. PATENT DOCUMENTS

| | | | |
|---|---|---|---|
| 3,430,090 | 2/1969 | Vodoklys et al. | 252/301.6 R |
| 4,208,448 | 6/1980 | Panaccione | 252/301.6 F X |
| 4,602,188 | 7/1986 | de Hair et al. | 313/487 |
| 4,800,319 | 1/1989 | Van Kemenade et al. | 313/487 |
| 4,933,600 | 6/1990 | Endres | 313/487 |
| 4,950,948 | 8/1990 | Peters et al. | 252/301.6 F X |
| 5,049,779 | 9/1991 | Itsuji et al. | 313/486 |
| 5,447,660 | 9/1995 | Chau | 252/301.4 H |
| 5,471,113 | 11/1995 | De Backer et al. | 252/30.4 R X |

FOREIGN PATENT DOCUMENTS

| | | |
|---|---|---|
| 0457392 | 11/1991 | European Pat. Off. . |
| 0596548 | 5/1994 | European Pat. Off. . |
| 5535423 | 3/1980 | Japan . |

*Primary Examiner*—Sandra L. O'Shea
*Assistant Examiner*—Mack Haynes
*Attorney, Agent, or Firm*—Ernestine C. Bartlett

[57] ABSTRACT

A phosphor blend and a low pressure discharge lamp utilizing such a phosphor blend is provided having a lamp envelope 3 having an inner surface 15, means 5,6,7,9,13 within the lamp envelope for generating ultraviolet radiation; and a layer 17 of a luminescent material adjacent the inner surface of the lamp envelope for generating visible light when impinged by the ultraviolet radiation. The luminescent material is a phosphor blend consisting essentially of (1) a first luminescent material comprising gadolinium and magnesium pentaborate, preferably activated by cerium, manganese, and terbium; (2) a second luminescent zinc silicate material; (3) a third luminescent alkaline earth halophosphate material; and (4) a fourth luminescent alkaline earth metal halophosphate material, the components of said blend being combined in proportions which are selected depending on the lamp color desired whereby a full spectrum in visible and CRI values of at least 82 are provided.

18 Claims, 3 Drawing Sheets

ELECTRIC LAMP HAVING FLUORESCENT LAMP COLORS CONTAINING A WIDE BANDWIDTH EMISSION RED PHOSPHOR

FIELD OF THE INVENTION

This invention relates to an improvement in electric lamps having a lamp envelope with a phosphor coating, and more particularly, to a low-pressure mercury vapor discharge lamp having a closed discharge vessel containing a rare or inert gas and provided on its inside with a luminescent layer which comprises a luminescent material, the lamp showing emission of radiation during operation; and to phosphors used therein.

BACKGROUND OF THE INVENTION

Such a fluorescent lamp is known, for example from EP 0 457 392 A1 wherein the luminescent layer comprises as its luminescent materials: (a) 33 to 44% by weight of a white luminescing alkaline earth metal halophosphate activated by trivalent antimony and bivalent manganese; 27% to 36% by weight of a blue luminescing alkaline earth metal halophosphate activated by trivalent antimony; and (c) 20 to 40% by weight of red luminescing yttrium oxide activated by trivalent europium wherein during operation of the lamp about one third of the total quantity of radiant energy supplied by the lamp is emitted in each of the three spectral ranges 380–490 nm, 490–590 nm, and 590–700 nm.

Another example of a known fluorescent lamp is that disclosed and claimed in EP 0 596 548 A1 in which the low pressure lamp comprises a combination of five phosphors including (a) a SAE or BAE (strontium or barium aluminate activated by bivalent europium) or a SBP (strontium borophosphate activated by bivalent europium); (b) a CBM (pentaborate activated by trivalent cerium and bivalent manganese) comprising Gd and Mg with red $Mn^{+2}$ emission; (c) a BAM (barium magnesium aluminate activated by bivalent europium) or a SCAP (strontium chlorophosphate activated by bivalent europium; (d) a CAT (cerium magnesium aluminate activated by trivalent terbium) or a CBT (cerium magnesium pentaborate activated by trivalent terbium and trivalent cerium) or a CBTM (magnesium pentaborate comprising gadolinium and magnesium activated by trivalent cerium and by bivalent manganese and by trivalent terbium); and (e) a YOX (yttrium oxide activated by trivalent europium).

Such low pressure mercury vapor lamps, more commonly known as fluorescent lamps, have a lamp envelope with a filling of mercury and a rare gas and in which a gas discharge is maintained during lamp operation. The radiation emitted by the gas discharge is mainly in the ultraviolet region of the spectrum, with only a small portion being in the visible spectrum. The inner surface of the lamp envelope has a luminescent coating, often of a blend of phosphors, which emits visible light when impinged by the ultraviolet radiation.

Lighting accounts for approximately 20–25% of the electricity used annually in the U.S. For stores, offices and warehouses, lighting may account for up to 50% of their electrical consumption. Lighting is a primary focus of the National Energy Policy Act (EPACT) of 1992, which is specific federal legislation designed to drastically reduce national energy consumption. EPACT mandates energy efficiency standards for various lamp types in terms of lamp efficacy and color rendering index depending on the lamp size. Luminous efficacy is a measure of the useful light output in relation to the energy input to the lamp, in lumens per watt (LPW). The EPACT standards for fluorescent lamps are listed in Table 1 below. Fluorescent lamps which do not meet these minimum standards cannot be sold in the U.S. of America beginning with certain dates in 1994.

| EPACT FLUORESCENT LAMP STANDARDS | | | |
|---|---|---|---|
| LAMP | NOMINAL LAMP WATTAGE | MINIMUM CRI | MINIMUM AVERAGE LAW EFFICACY (LPW) |
| 4-FOOT | >35 W | 69 | 75.0 |
| MEDIUM BI-PIN | ≦35 W | 45 | 75.0 |
| 2-FOOT | >35 W | 69 | 68.0 |
| U-BENT | ≦35 W | 45 | 64.0 |
| 8-FOOT | >65 W | 69 | 80.0 |
| SLIMLINE | ≦65 W | 45 | 80.0 |
| 8-FOOT HIGH OUTPUT | >100 W | 69 | 80.0 |
| | ≦100 W | 45 | 80.0 |

The legislation also provides for certain exemptions from the Act. For example, certain fluorescent lamps that exhibit a CRI of 82 or above are exempted and thus may be sold without reference to EPACT requirements for efficacy. Many fluorescent lamps on the market prior to 1994 do not meet these mandated minimum efficacy requirements and exhibit CRIs that are too low to qualify the lamps for exemption under EPACT. Such lamps include lamps of the types: F96T12 and F40T12 CW (cool white [4100K]), F96T12 and F40T12 (Daylite [500K]), and F96T12 and F40T12 (warm white [3000K]). Either the efficacy or the CRT of such lamps must be raised to either meet the EPACT standards or be exempt from them or it will no longer be possible to manufacture and sell such lamps legally in the U.S.

Luminous efficacy is dependent on the efficiency at which the phosphor coating converts the ultraviolet radiation from the gas discharge into visible light, on electrode losses (specifically the cathode drop), thermal losses and losses in the column gas discharge. Lamp electrodes have already been highly optimized by the lamp industry for specific applications. Losses in the column discharge are primarily a function of lamp geometry. Thus, for fluorescent lamps of a given length, diameter and lifetime, a further reduction of losses at the electrodes and in the discharge is extremely difficult to attain.

The fluorescent layer is the single most important contributing factor in determining the luminous efficacy of fluorescent lamps. Increasing lamp efficacy through development of new or improved phosphors, however, is very time consuming, as well as expensive. Research and development in phosphors is accomplished primarily through large numbers of experiments because results are not-always predictable theoretically. Substitution of known high performing phosphors for other, lower performing phosphors is often not feasible either. While certain phosphors, such as the so called narrow band, rare earth phosphors, typically yttrium oxide, produce high luminous efficacy and excellent color rendering in lamps intended for the high end of the market, they are less than optimum because they are too expensive for use in lamps intended for standard or low cost applications which presently employ the relatively low cost halophosphate phosphors. The halophosphates, while cheaper and often successfully used to reduce the quantity of the more expensive rare earth phosphors, are most often detrimental to color rendering properties of the rare earth phosphor because of inferior emissions in the visible spectrum. Typically, calcium halophosphate activated with antimony and manganese, for example, will have a color rendering index (CRI) of about 60 and lamps utilizing this phosphor will not be exempt from EPACT for this reason.

Furthermore, the thickness or coating weight of each type of phosphor has already been optimized for the greatest light output. In general, if a luminescent layer is too thin, some of the U.V. radiation from the discharge will pass through the layer without being converted into visible light. If the layer becomes too thick, however, the phosphor itself absorbs and/or reflects a portion of the visible light generated in the region of the layer near the discharge. It is therefore common to optimize the layer thickness for a satisfactory output. This has been determined to be about 30 to 40 microns in general. Even with this optimized layer thickness, however, the particular type of phosphor, the cost of the phosphor and emission properties thereof are still the primary considerations that affect the choice available to those desiring to produce fluorescent lamps.

Most fluorescent lamps with high CRIs use a mixture of narrow band phosphors to transform the U.V. mercury discharge into visible radiation. The red component in these lamps is typically yttrium oxide activated with europium. This phosphor is expensive and has a very narrow emission in the red area of the spectrum.

Full spectrum fluorescent lamps are also available. Such lamps use a variety of phosphor blends, with the red component being either yttrium oxide activated with europium, or other red emission phosphors, such as the very expensive magnesium fluorogermanate activated with manganese. Additionally, the typical phosphor blends used by the industry have a deficiency in red due to the narrow band emission of the yttrium oxide phosphor.

SUMMARY OF THE INVENTION

This invention is directed to the fluorescent materials used to generate a phosphor layer deposited on the inside of a glass envelope and makes it possible to generate a series of phosphor blends at required color targets for the production of inexpensive, high CRI fluorescent lamps wherein the CRI values are above the limits established by EPACT and are sufficient to exampt the lamps from EPACT.

More particularly, this invention relates to inexpensive phosphor blends comprising a red emission phosphor with a large bandwidth, the phosphor blend consisting essentially of (1) a first luminescent material comprising a pentaborate comprising gadolinium and magnesium activated by trivalent cerium and bivalent manganese, and trivalent terbium; (2) a second luminescent material comprising zinc silicate activated with manganese; (3) a third luminescent material comprising an alkaline earth halophosphate, preferably calcium halophosphate activated with antimony; and (4) an alkaline earth metal halophosphate activated with manganese and antimony, combined in varying proportions which are selected depending on the lamp color desired whereby a full spectrum in visible and high CRI values is provided. Within the ratios described hereinbelow, the phosphor mixture containing the wide bandwidth red emission phosphor will generate CRI values above 82, thereby providing an inexpensive and effective alternative that is exempted by the EPACT legislation.

The amount of the first luminescent material, the red phosphor, relative to the amounts of the halophosphates and the green component will determine the position of the lamps's color coordinates and the value of its CRI making it possible to fix the CRI value and the chromaticity independently.

Full spectrum phosphor blends of the invention are preferably four-phosphor blends of the following materials combined in the following proportions:

(1) about 8 to 20%, preferably 18 to 19.5%, of a first luminescent material which is preferably gadolinium magnesium borate activated with manganese, cerium and terbium (CBTM), a red luminescing material;

(2) about 4 to 6%, preferably 4.5 to 5.5%, of a second luminescent material comprising zinc silicate activated with manganese (a green luminescing material);

(3) about 20 to 55%, preferably 23 to 52%, of a third luminescent material comprising an alkaline earth halophosphate, preferably calcium halophosphate activated with antimony (blue halo); and (4) about 20 to 55%, preferably 23 to 52%, of a fourth luminescent material comprising an alkaline earth halophosphate, preferably calcium halophosphate activated with manganese and antimony (Warm white), wherein the percentages are based on the total weight of the phosphor blend and the combined percentages amount to a total of 100%.

These phosphors are dispersible at low shear and are compatible with each other and may be prepared, blended and applied as a phosphor coating using techniques that are well known in the art.

The various components of the fluorescent blend are known in the art. Thus the components comprising the first luminescent material, referred to as CBTM hereinafter, are known from EPO 596 548 A1 and may be represented by the formula

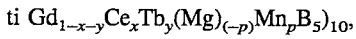

in which up to 20 mole % of the B may be replaced by Al and/or Ga, and in which $0.01 \leq x \leq 1-y$, $0.01 \leq y \leq 0.75$ and $0.01 \leq p \leq 0.30$.

An electric lamp according to the invention comprises a lamp envelope having an inner surface and means within the lamp envelope for generating ultraviolet radiation. A layer of a luminescent material comprising a phosphor blend of the invention is adjacent the inner surface of the lamp envelope for generating visible light when impinged by the ultraviolet radiation. The lamp may also include, if desired, a second layer, between the inner surface of the lamp envelope and the layer of luminescent material, for reflecting ultraviolet radiation which has passed through the layer of luminescent material back into said luminescent material for increasing the visible light output of the luminescent material.

DETAILED DESCRIPTION OF PREFERRED EMBODIMENTS

Figure 1:
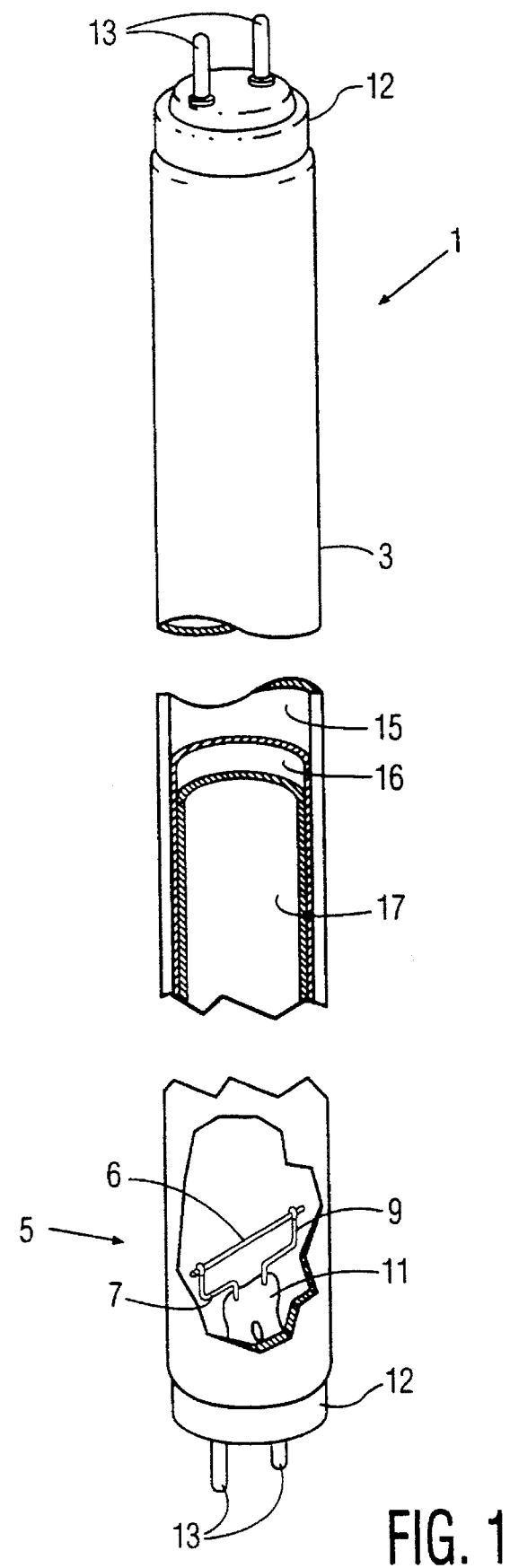
FIG. 1 is a perspective view of a fluorescent lamp, i.e., a low-pressure mercury vapor discharge lamp, partly in cross-section, partly broken away, having a phosphor blend luminescent material according to the invention.
Figure 2:
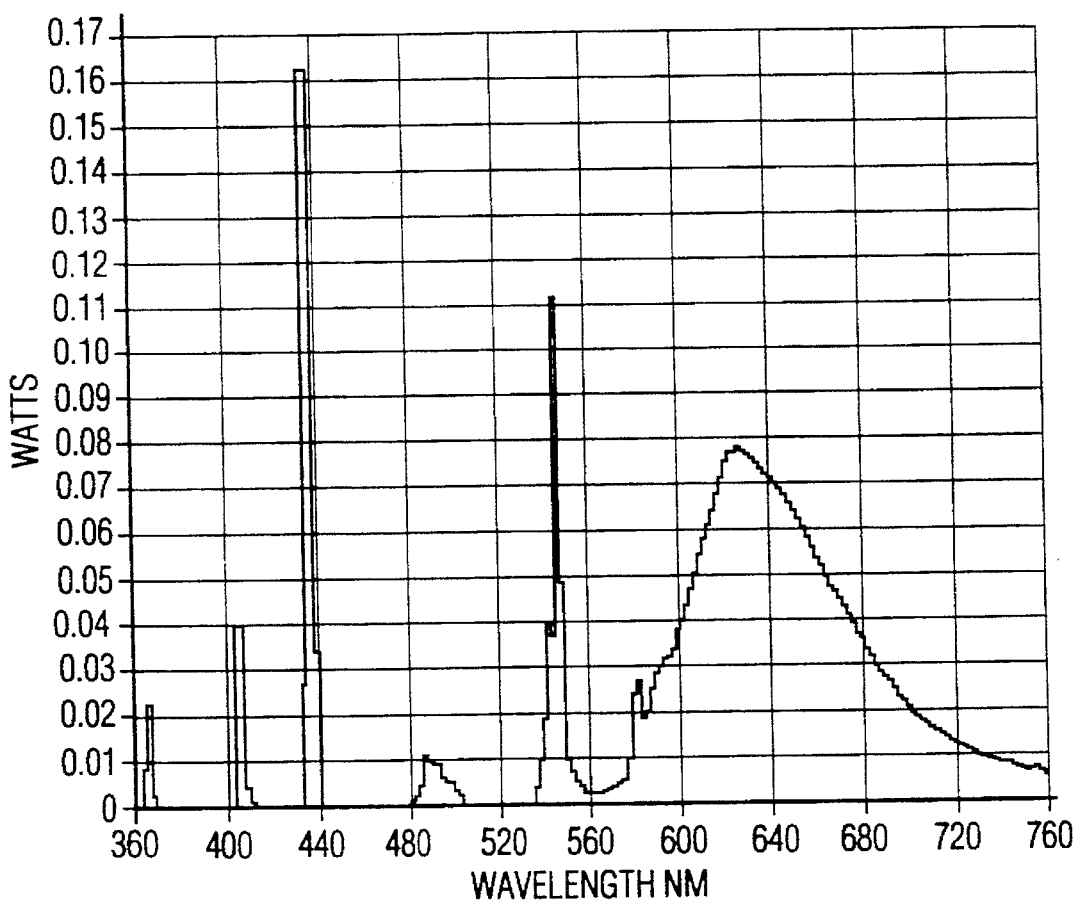
FIG. 2 is a graph showing the large bandwidth of a red emission phosphor according to the invention.
Figure 3:
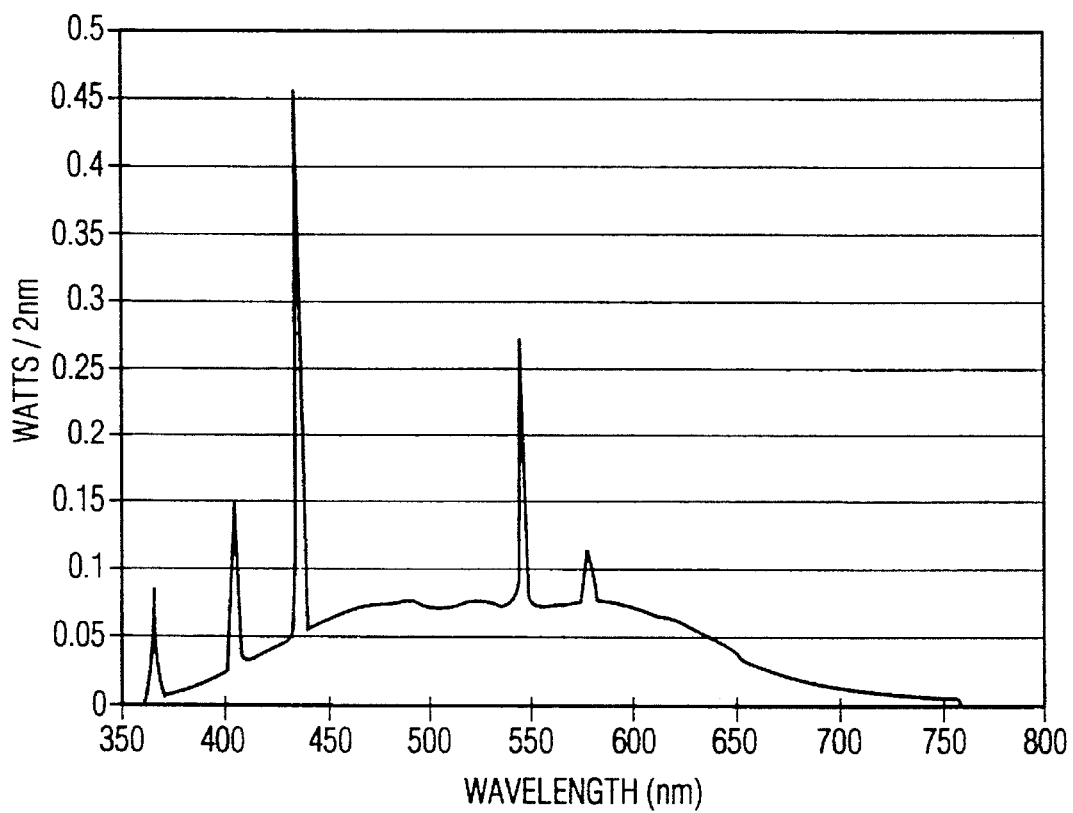
FIG. 3 shows the emission spectrum of a low-pressure mercury vapor discharge lamp according to the invention.

FIG. 1 illustrates a low pressure mercury vapor fluorescent lamp 1 with an elongated outer envelope, or bulb, 3.

The lamp includes a conventional electrode structure 5 at each end which includes a filament 6 supported on in-lead wires 7 and 9 which extend through a glass press seal 11 in a mount stem 10. The leads 7,9 are connected to the pin-shaped contacts 13 of their respective bases 12 fixed at opposite ends of the lamp. The discharge-sustaining filling includes an inert gas such as argon, or a mixture of argon and other gases, at a low pressure in combination with a small quantity of mercury to sustain an arc discharge during lamp operation. Optionally, the inner surface 15 of the outer envelope 3 may be provided with an undercoat 16 of gamma alumina. A phosphor coating 17 is disposed over the undercoat 16. Preferably, both coatings extend the full length of the bulb, completely circumferentially around the bulb inner wall.

The following examples will serve to further illustrate the invention:

EXAMPLE 1

A conventional Artic Brite lamp contains a two phosphor mix of 84% cool white phosphor (calcium halophosphate activated with manganese and antimony) and 16% blue halo (calcium halophosphate activated with antimony), has a low LPW value, a CRI of 66, is unacceptable under EPACT standards and has a CRI that is too low for the lamp to be exempt from EPACT. A phosphor blend of the invention was applied as a coating for use within the color acceptance criteria for Artic Brite and had the following formulation:

(1) 38.6% Calcium halophosphate activated with manganese and antimony (Warm white);

(2) 4.8% zinc silicate activated with manganese;

(3) 37.6% calcium halophosphate activated with antimony (blue halo); and (4) 19.0% gadolinium magnesium borate activated with manganese, cerium and terbium (CBTM). Artic Brite Lamps produced with the phosphor blend of the invention were compared with the conventional Artic Brite lamps, shown below as the "control", with the following results: The control had a CRI of 66.2. The lamp of the invention (Example 1) had a CRI of 82.2. The lamp of Example 1 also has color coordinates of x=0.350 and y=0.365, an excellent color match with the conventional product, a lumen output that is 10–12% lower than that of the conventional product, and a cost that is substantially lower than the conventional lamps of this type with high CRIs, eg., lamps of this type containing yttrium oxide phosphor. At the same time, the lamp of the invention exhibits a CRI that is sufficiently high to qualify it for exemption under EPACT.

EXAMPLE 2

A conventional Daylight fluorescent lamp (6500K±200K) contains a two phosphor mix of about 50% white calcium halophosphate activated with antimony and manganese, and about 50% blue halo calcium halophosphate activated with antimony will not meet the requirements of EPACT. A phosphor blend of the invention was applied as a coating for use within the color acceptance criteria for Daylight F96T12 lamps and had the following formulation:

(1) 25.0% Calcium halophosphate activated with manganese and antimony (Warm white);

(2) 4.3% zinc silicate activated with manganese;

(3) 52.2% calcium halophosphate activated with antimony (blue halo); and (4) 18.5% cerium gadolinium magnesium borate activated with manganese (CBTM). Photometry results with the F96T12 lamps produced with the phosphor blend of the invention after 100 hours (average of 20 readings) were as follows: CRI=85.6; Lumen Output=4483 lumens; Color: x=0.319; y=0.343.

The lamp of Example 2 provides an excellent color match with the conventional product while exhibiting a CRI that is sufficiently high to make it exempt under EPACT.

It will be seen that the invention provides a series of phosphor blends at required color targets for the production of inexpensive, high CRI fluorescent lamps wherein the CRI values are above the limits established by EPACT. The invention also provides a family of fluorescent lamp colors containing a wide bandwidth emission red phosphor over a full spectrum of visible and high CRI values.

While preferred embodiments of the invention have been shown and described, various other embodiments and modifications thereof will become apparent to those of ordinary skill in the art, and will fall within the scope of the invention as defined by the appended claims.

We claim:

1. An electric lamp, which comprises:

a. a lamp envelope having an inner surface;

b. means within the lamp envelope for generating ultraviolet radiation; and c. a layer of a luminescent material adjacent the inner surface of the lamp envelope for generating visible light when impinged by the ultraviolet radiation, said luminescent material comprising a phosphor blend consisting essentially of (1) a first luminescent material comprising a pentaborate comprising gadolinium and magnesium activated by trivalent cerium, trivalent terbium and bivalent manganese; (2) a second luminescent material comprising zinc silicate activated with manganese; (3) a third luminescent material comprising an alkaline earth metal halophosphate activated with antimony; and (4) an alkaline earth metal halophosphate activated with manganese and antimony, the components of said blend being combined in proportions which are selected depending on the lamp color desired whereby a full spectrum in visible and CRI values of at least 82 are provided.

2. A lamp as claimed in claim 1 wherein said first luminescent material is a red phosphor selected from the formula

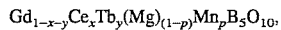

in which up to 20 mole % of the B may be replaced by Al and/or Ga, and in which $0.01 \leq x \leq 1-y$, $0.01 \leq y \leq 0.75$ and $0.01 \leq p \leq 0.30$.

3. A lamp as claimed in claim 1 wherein said phosphor blend comprises:

(1) about 8 to 20% by weight of said first luminescent material;

(2) about 4 to 6% by weight of said second luminescent material;

(3) about 20 to 55% of said third luminescent material; and (4) about 20 to 55% of said fourth luminescent material.

4. A lamp as claimed in claim 3, wherein said luminescent layer is applied to a second layer between the inner surface of the lamp envelope and the layer of luminescent material.

5. An electric lamp, which comprises:

a. a lamp envelope having an inner surface;

b. means within the lamp envelope for generating ultraviolet radiation; and c. a layer of a luminescent material adjacent the inner surface of the lamp envelope for generating visible light when impinged by the ultraviolet radiation, said luminescent material comprising a phosphor blend consisting essentially of (1) about 8 to 20% of a first red luminescent gadolinium magnesium borate activated with cerium, manganese, and terbium material;

(2) about 4 to 6% of a second green luminescent zinc silicate activated with manganese material;

(3) about 20 to 55% of a third luminescent blue halo calcium halophosphate activated with antimony material; and (4) about 20 to 55% of a fourth luminescent warm white calcium halophosphate activated with manganese and antimony material, the components of said blend being combined in proportions which are selected depending on the lamp color desired whereby a full spectrum in visible and CRI values of at least 82 are provided.

6. A lamp as claimed in claim 5, wherein said phosphor blend contains the following:

(1) 18 to 19.5% of said first luminescent material;

(2) 4.5 to 5.5% of said second luminescent material;

(3) 23 to 52% of said third luminescent material; and (4) 23 to 52% of said fourth luminescent material.

7. An electric lamp, which comprises:

a. a lamp envelope having an inner surface;

b. means within the lamp envelope for generating ultraviolet radiation; and c. a layer of a luminescent material adjacent the inner surface of the lamp envelope for generating visible light when impinged by the ultraviolet radiation, said luminescent material comprising a phosphor blend consisting essentially of (1) 18.5% by weight of a first red luminescent gadolinium magnesium borate activated with cerium, manganese and antimony material, said borate being selected from compounds having the general formula $$Gd_{1-x-y}Ce_xTb_y(Mg)_{(1-p)}Mn_pB_5O_{10},$$

in which up to 20 mole % of the B may be replaced by Al and/or Ga, and in which $0.01 \leq x \leq 1-y$, $0.01 \leq y \leq 0.75$ and $0.01 \leq p \leq 0.30$;

(2) 25.0% by weight calcium halophosphate activated with manganese and antimony;

(3) 4.3% by weight zinc silicate activated with manganese; and (4) 52.2% by weight calcium halophosphate activated with antimony.

8. An electric lamp, which comprises:

a. a lamp envelope having an inner surface;

b. means within the lamp envelope for generating ultraviolet radiation; and c. a layer of a luminescent material adjacent the inner surface of the lamp envelope for generating visible light when impinged by the ultraviolet radiation, said luminescent material comprising a phosphor blend consisting essentially of (1) 19% by weight of a first red luminescent gadolinium magnesium borate activated with cerium, manganese, and terbium material, said borate being selected from compounds having the general formula $$Gd_{1-x-y}Ce_xTb_y(Mg)_{(1-p)}Mn_pB_5O_{10},$$

in which up to 20 mole % of the B may be replaced by Al and/or Ga, and in which $0.01 \leq x \leq 1-y$, $0.01 \leq y \leq 0.75$ and $0.01 \leq p \leq 0.30$;

(2) 38.6% by weight calcium halophosphate activated with manganese and antimony;

(3) 4.8% by weight zinc silicate activated with manganese; and (4) 37.6% by weight calcium halophosphate activated with antimony.

9. An electric lamp, which comprises:

a. a lamp envelope having an inner surface;

b. means within the lamp envelope for generating ultraviolet radiation; and c. a layer of a luminescent material adjacent the inner surface of the lamp envelope for generating visible light when impinged by the ultraviolet radiation, said luminescent material comprising a phosphor blend consisting essentially of (1) 8 to 20% by weight of a first red luminescent gadolinium magnesium borate activated with cerium, manganese, and terbium material, said borate being selected from compounds having the general formula $$Gd_{1-x-y}Ce_xTb_y(Mg)_{(1-p)}Mn_pB_5O_{10},$$

in which up to 20 mole % of the B may be replaced by Al and/or Ga, and in which $0.01 \leq x \leq 1-y$, $0.01 \leq y \leq 0.75$ and $0.01 \leq p \leq 0.30$;

(2) about 4 to 6% of a second green luminescent zinc silicate material;

(3) about 20 to 55% of a third luminescent blue halo calcium halophosphate material; and (4) about 20 to 55% of a fourth luminescent warm white calcium halophosphate material, the components of said blend being combined in proportions which are selected depending on the lamp color desired whereby a full spectrum in visible and CRI values of at least 82 are provided.

10. A phosphor blend for generating visible light when impinged by ultraviolet radiation, said phosphor blend consisting essentially of (1) a first luminescent material comprising a pentaborate comprising gadolinium and magnesium activated by trivalent cerium, trivalent terbium and bivalent manganese;

(2) a second luminescent material comprising zinc silicate activated with manganese;

(3) a third luminescent material comprising an alkaline earth metal halophosphate activated with antimony; and (4) an alkaline earth metal halophosphate activated with manganese and antimony, the components of said blend being combined in proportions which are selected depending on the color desired whereby a full spectrum in visible and CRI values of at least 82 are provided.

11. A phosphor as claimed in claim 10 wherein said first luminescent material is a red phosphor selected from the formula $$Gd_{1-x-y}Ce_xTb_y(Mg)_{(1-p)}Mn_pB_5O_{10},$$

in which up to 20 mole % of the B may be replaced by Al and/or Ga, and in which $0.01 \leq x \leq 1-y$, $0.01 \leq y \leq 0.75$ and $0.01 \leq p \leq 0.30$.

12. A phosphor as claimed in claim 11 wherein said phosphor blend comprises:
   (1) about 8 to 20% by weight of said first luminescent material;
   (2) about 4 to 6% by weight of said second luminescent material;
   (3) about 20 to 55% of said third luminescent material; and
   (4) about 20 to 55% of said fourth luminescent material.

13. A phosphor as claimed in claim 11, wherein said ultraviolet radiation is generated by an arc tube disposed within a low-pressure lamp envelope, said arc tube including a filling of an ionizable material and a rare gas, and a pair of discharge electrodes between which a discharge takes place during lamp operation.

14. A phosphor for generating visible light when impinged by ultraviolet radiation, said phosphor blend consisting essentially of
   (1) about 8 to 20% of a first red luminescent gadolinium magnesium borate activated with cerium, manganese, and terbium material;
   (2) about 4 to 6% of a second green luminescent zinc silicate activated with manganese material;
   (3) about 20 to 55% of a third luminescent blue halo calcium halophosphate activated with antimony material; and
   (4) about 20 to 55% of a fourth luminescent warm white calcium halophosphate activated with manganese and antimony material, the components of said blend being combined in proportions which are selected depending on the color desired whereby a full spectrum in visible and CRI values of at least 82 are provided.

15. A phosphor as claimed in claim 14, wherein said phosphor blend contains the following:
   (1) 18 to 19.5% of said first luminescent material;
   (2) 4.5 to 5.5% of said second luminescent material;
   (3) 23 to 52% of said third luminescent material; and
   (4) 23 to 52% of said fourth luminescent material.

16. A phosphor for generating visible light when impinged by ultraviolet radiation consisting essentially of a phosphor blend of (1) 18.5% by weight of a first red luminescent cerium gadolinium magnesium borate activated with manganese material, said borate being selected from compounds having the general formula

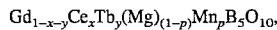
$Gd_{1-x-y}Ce_xTb_y(Mg)_{(1-p)}Mn_pB_5O_{10}$, in which up to 20 mole % of the B may be replaced by Al and/or Ga, and in which $0.01 \leq x \leq 1-y$, $0.01 \leq y \leq 0.75$ and $0.01 \leq p \leq 0.30$;
   (2) 25.0% by weight calcium halophosphate activated with manganese and antimony;
   (3) 4.3% by weight zinc silicate activated with manganese; and
   (4) 52.2% by weight calcium halophosphate activated with antimony.

17. A phosphor for generating visible light when impinged by ultraviolet radiation, consisting essentially of a phosphor blend of (1) 19% by weight of a first red luminescent cerium gadolinium magnesium borate activated with manganese material, said borate being selected from compounds having the general formula

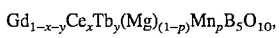
$Gd_{1-x-y}Ce_xTb_y(Mg)_{(1-p)}Mn_pB_5O_{10}$, in which up to 20 mole % of the B may be replaced by Al and/or Ga, and in which $0.01 \leq x \leq 1-y$, $0.01 \leq y \leq 0.75$ and $0.01 \leq p \leq 0.30$;
   (2) 38.6% by weight calcium halophosphate activated with manganese and antimony;
   (3) 4.8% by weight zinc silicate activated with manganese; and
   (4) 37.6% by weight calcium halophosphate activated with antimony.

18. A phosphor for generating visible light when impinged by ultraviolet radiation consisting essentially of a phosphor blend of
   (1) 8 to 20% by weight of a first red luminescent cerium gadolinium magnesium borate material, said borate being selected from compounds having the general formula

$Gd_{1-x-y}Ce_xTb_y(Mg)_{(1-p)}Mn_pB_5O_{10}$, in which up to 20 mole % of the B may be replaced by Al and/or Ga, and in which $0.01 \leq x \leq 1-y$, $0.01 \leq y \leq 0.75$ and $0.01 \leq p \leq 0.30$;
   (2) about 4 to 6% of a second green luminescent zinc silicate material;
   (3) about 20 to 55% of a third luminescent blue halo calcium halophosphate material; and
   (4) about 20 to 55% of a fourth luminescent warm white calcium halophosphate material, the components of said blend being combined in proportions which are selected depending on the color desired whereby a full spectrum in visible and CRI values of at least 82 are provided.

* * * * *